United States Patent
Okada et al.

(10) Patent No.: US 11,675,052 B2
(45) Date of Patent: Jun. 13, 2023

(54) ELECTROMAGNETIC WAVE DETECTION APPARATUS, PROGRAM, AND ELECTROMAGNETIC WAVE DETECTION SYSTEM

(71) Applicant: KYOCERA Corporation, Kyoto (JP)

(72) Inventors: Hiroki Okada, Machida (JP); Eri Uchida, Yokohama (JP); Yukitoshi Kanayama, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 658 days.

(21) Appl. No.: 16/638,078

(22) PCT Filed: Aug. 3, 2018

(86) PCT No.: PCT/JP2018/029299
§ 371 (c)(1),
(2) Date: Feb. 10, 2020

(87) PCT Pub. No.: WO2019/039241
PCT Pub. Date: Feb. 28, 2019

(65) Prior Publication Data
US 2020/0217655 A1 Jul. 9, 2020

(30) Foreign Application Priority Data

Aug. 25, 2017 (JP) .............................. JP2017-162557

(51) Int. Cl.
*G01S 7/481* (2006.01)
*G01C 3/06* (2006.01)
(Continued)

(52) U.S. Cl.
CPC .............. *G01S 7/4816* (2013.01); *G01C 3/06* (2013.01); *G01S 7/486* (2013.01); *G01S 17/89* (2013.01)

(58) Field of Classification Search
CPC ... G01C 3/06; G01J 5/48; G01S 17/10; G01S 17/42; G01S 17/86; G01S 17/89;
(Continued)

(56) References Cited

U.S. PATENT DOCUMENTS 7,342,663 B2    3/2008   Matsushita et al.
7,714,997 B2    5/2010   Shibata et al.
(Continued)

FOREIGN PATENT DOCUMENTS

JP    2005-241370 A   *  9/2005   ............. G01N 21/84
JP    2005241370 A      9/2005
(Continued)

*Primary Examiner* — Mohammed S Rahaman
(74) *Attorney, Agent, or Firm* — Studebaker & Brackett PC

(57) ABSTRACT

An electromagnetic wave detection apparatus 10 includes a separator 16, a first detector 17, a switching unit 18, and a second detector 20. The separator 16 is capable of switching between a separation state and a non-separation state. The separator 16 separates incident electromagnetic waves to travel in a first direction d1 and a second direction d2, in the separation state. The first detector 17 detects electromagnetic waves traveling in the first direction d1. The switching unit 18 includes a plurality of switching elements "se". Each switching element "se" is capable of switching a traveling direction of electromagnetic waves traveling in the second direction d2 between a third direction d3 and a fourth direction d4. The second detector 20 detects electromagnetic waves traveling in the third direction d3.

21 Claims, 9 Drawing Sheets

(51) Int. Cl.
*G01S 7/486* (2020.01)
*G01S 17/89* (2020.01)

(58) Field of Classification Search
CPC ...... G01S 7/481; G01S 7/4816; G01S 7/4817; G01S 7/486
See application file for complete search history.

(56) References Cited

U.S. PATENT DOCUMENTS

| | | |
|---|---|---|
| 8,004,666 B2 | 8/2011 | Shibata et al. |
| 8,228,494 B2 | 7/2012 | Shibata et al. |
| 9,689,667 B2 | 6/2017 | Royo Royo et al. |
| 2007/0211254 A1 | 9/2007 | Matsushita et al. |
| 2008/0144023 A1* | 6/2008 | Shibata ............ G01N 21/4788 356/237.2 |
| 2010/0208249 A1 | 8/2010 | Shibata et al. |
| 2010/0245811 A1* | 9/2010 | Yoshikawa ............ G01B 11/24 356/237.2 |
| 2011/0292390 A1 | 12/2011 | Shibata et al. |
| 2012/0120231 A1* | 5/2012 | Itani .................. G01N 21/3581 348/135 |
| 2015/0131087 A1 | 5/2015 | Ohtsubo et al. |

FOREIGN PATENT DOCUMENTS

| | | | | |
|---|---|---|---|---|
| JP | 2008116405 A | | 5/2008 | |
| JP | 2011220732 A | | 11/2011 | |
| JP | 2013-145145 A | * | 7/2013 | ............. G01N 21/84 |
| JP | 2013145145 A | | 7/2013 | |
| JP | 2014-512525 A | | 5/2014 | |
| WO | 2005054826 A1 | | 6/2005 | |
| WO | 2009133849 A1 | | 11/2009 | |

* cited by examiner

ELECTROMAGNETIC WAVE DETECTION APPARATUS, PROGRAM, AND ELECTROMAGNETIC WAVE DETECTION SYSTEM

CROSS REFERENCE TO RELATED APPLICATION

This application claims priority to and the benefit of Japanese Patent Application No. 2017-162557 filed on Aug. 25, 2017, the entire disclosure of which is incorporated herein by reference.

TECHNICAL FIELD

The present disclosure relates to an electromagnetic wave detection apparatus, a program, and an electromagnetic wave detection system.

BACKGROUND

Apparatuses that obtain information about the surroundings from detection results by a plurality of detectors for detecting electromagnetic waves have been developed in recent years. For example, an apparatus that measures, using lidar, the position of an object in an image captured by an infrared camera is known (see PTL 1).

CITATION LIST

Patent Literature

PTL 1: JP 2011-220732 A

SUMMARY

An electromagnetic wave detection apparatus according to a first aspect comprises: a separator configured to switch between a separation state in which incident electromagnetic waves are separated to travel in a first direction and a second direction and a non-separation state in which the incident electromagnetic waves are not separated; a first detector configured to detect electromagnetic waves traveling in the first direction; a switching unit including a plurality of switching elements each configured to switch a traveling direction of electromagnetic waves traveling in the second direction between a third direction and a fourth direction; and a second detector configured to detect electromagnetic waves traveling in the third direction.

An electromagnetic wave detection system according to a second aspect comprises: a separator configured to switch between a separation state in which incident electromagnetic waves are separated to travel in a first direction and a second direction and a non-separation state in which the incident electromagnetic waves are not separated; a first detector configured to detect electromagnetic waves traveling in the first direction; a switching unit including a plurality of switching elements each configured to switch a traveling direction of electromagnetic waves traveling in the second direction between a third direction and a fourth direction; a second detector configured to detect electromagnetic waves traveling in the third direction; and a controller configured to acquire information about surroundings, based on electromagnetic wave detection results from the first detector and the second detector.

A program according to a third aspect causes an apparatus to execute: switching between a separation state in which incident electromagnetic waves are separated to travel in a first direction and a second direction and a non-separation state in which the incident electromagnetic waves are not separated; detecting electromagnetic waves traveling in the first direction; causing a plurality of switching elements each configured to switch a traveling direction of electromagnetic waves traveling in the second direction between a third direction and a fourth direction, to switch the traveling direction to the third direction or the fourth direction; and detecting electromagnetic waves traveling in the third direction.

DETAILED DESCRIPTION

Embodiments of an electromagnetic wave detection apparatus to which the present disclosure is applied will be described below, with reference to the drawings. In a structure that detects electromagnetic waves by a plurality of detectors for detecting electromagnetic waves, the detection axis of each detector is different. Therefore, even when each detector performs detection on the same region, the coordinate system in the detection result is different for each detector. Therefore, it is advantageous to reduce this difference between the coordinate systems in the detection results from the detectors. However, reducing the difference by correction is impossible or difficult. An electromagnetic wave detection apparatus to which the present disclosure is applied is configured to reduce difference between the detection axes of detectors, and thus can reduce difference between the coordinate systems in the detection results from the detectors.

Figure 1:
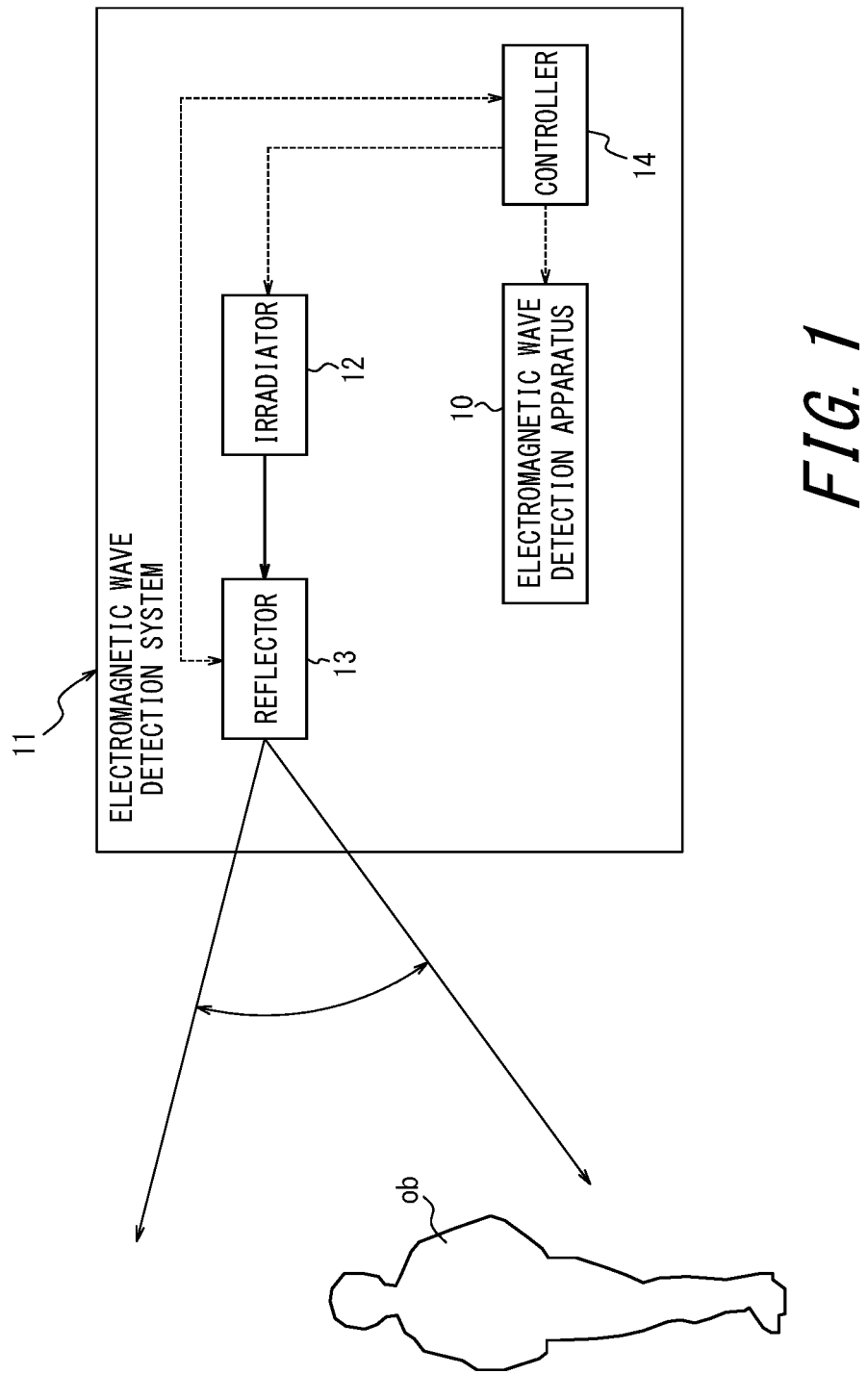
FIG. 1 is a functional block diagram illustrating a schematic structure of an electromagnetic wave detection system including an electromagnetic wave detection apparatus according to a first embodiment.

An electromagnetic wave detection system 11 including an electromagnetic wave detection apparatus 10 according to a first embodiment of the present disclosure includes the electromagnetic wave detection apparatus 10, an irradiator 12, a reflector 13, and a controller 14, as illustrated in FIG. 1.

In the drawings, dashed lines connecting functional blocks indicate the flow of control signals or the communication of information. Communications indicated by dashed lines may be wire communications or wireless communications. Solid lines extending from functional blocks indicate electromagnetic waves in beam form.

Figure 2:
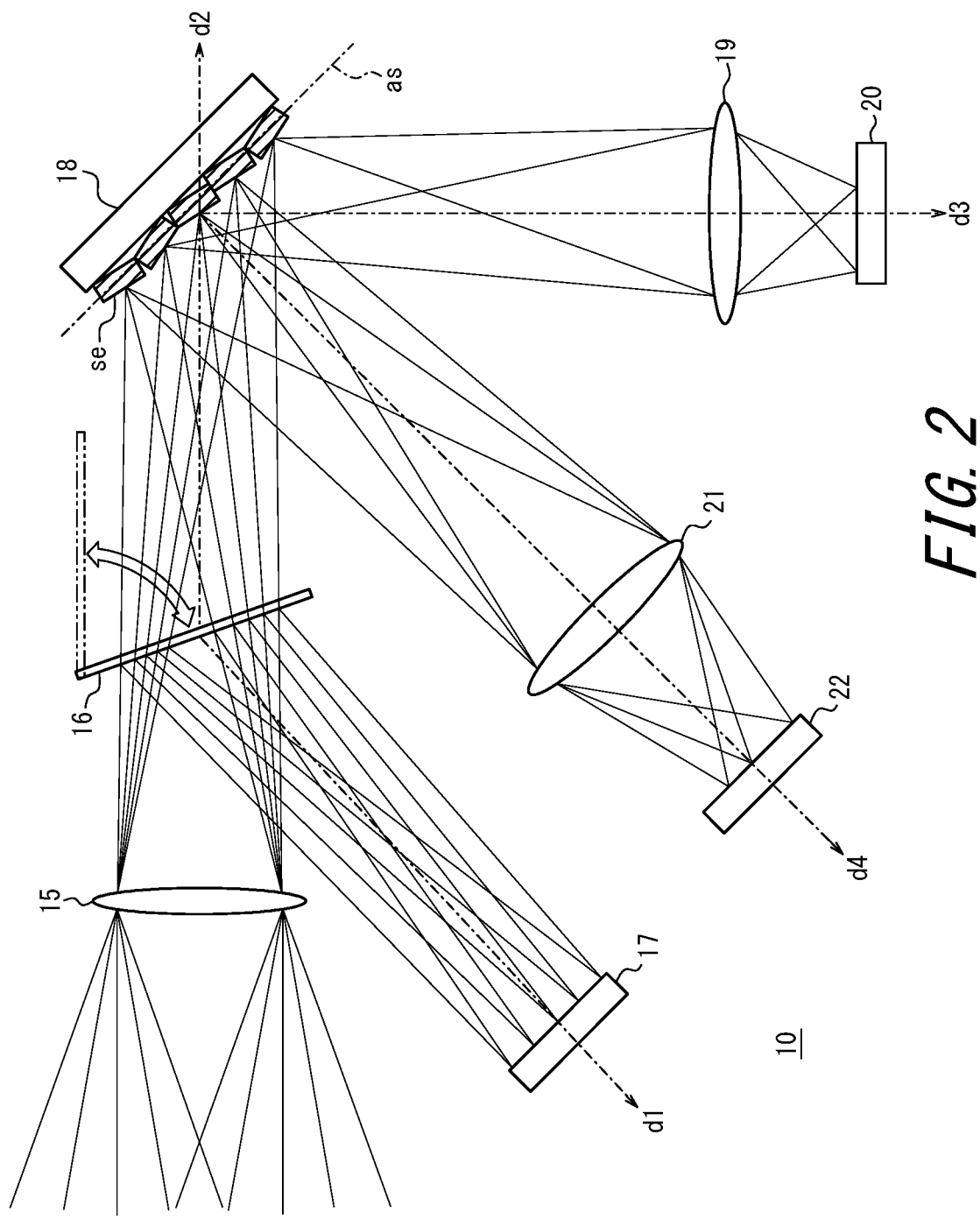
FIG. 2 is a diagram illustrating a schematic structure of the electromagnetic wave detection apparatus in FIG. 1.

The electromagnetic wave detection apparatus 10 includes an upstream optical system 15, a separator 16, a first detector 17, a switching unit 18, a first downstream optical system 19, a second detector 20, a second downstream optical system 21, and a third detector 22, as illustrated in FIG. 2.

The upstream optical system 15 includes, for example, at least one of a lens and a mirror, and forms an image of an object "ob" as a subject.

The separator 16 is located between the upstream optical system 15 and a primary image formation position that is position of an image formed by the upstream optical system 15 of an image of the object "ob" at a predetermined position distant from the upstream optical system 15. The separator 16 is capable of switching between a separation state and a non-separation state. In the separation state, the separator 16 separates incident electromagnetic waves such that they travel in a first direction d1 and a second direction d2. In the non-separation state (indicated by dashed-dotted lines), the separator 16 causes incident electromagnetic waves to travel in the second direction d2.

The separator 16 comprises a separation surface. The separator 16 can switch the separation surface between a state in which it is not located in the traveling path of incident electromagnetic waves, that is, electromagnetic waves which have passed through the upstream optical system 15, and a state in which it is located in the traveling path. By switching the separation surface from the state in which it is not located in the traveling path to the state in which it is located in the traveling path, the separator 16 switches from the non-separation state to the separation state. By switching the separation surface from the state in which it is located in the traveling path to the state in which it is not located in the traveling path, the separator 16 switches from the separation state to the non-separation state.

More specifically, in the first embodiment, the separator 16 can switch the separation surface between the state in which it is not located in the traveling path of electromagnetic waves and the state in which it is located in the traveling path, by moving the separation surface between outside the traveling path of electromagnetic waves and the traveling path. By moving the separation surface from outside the traveling path into the traveling path, the separator 16 switches from the non-separation state to the separation state. By moving the separation surface from the traveling path to outside the traveling path, the separator 16 switches from the separation state to the non-separation state.

Figure 3:
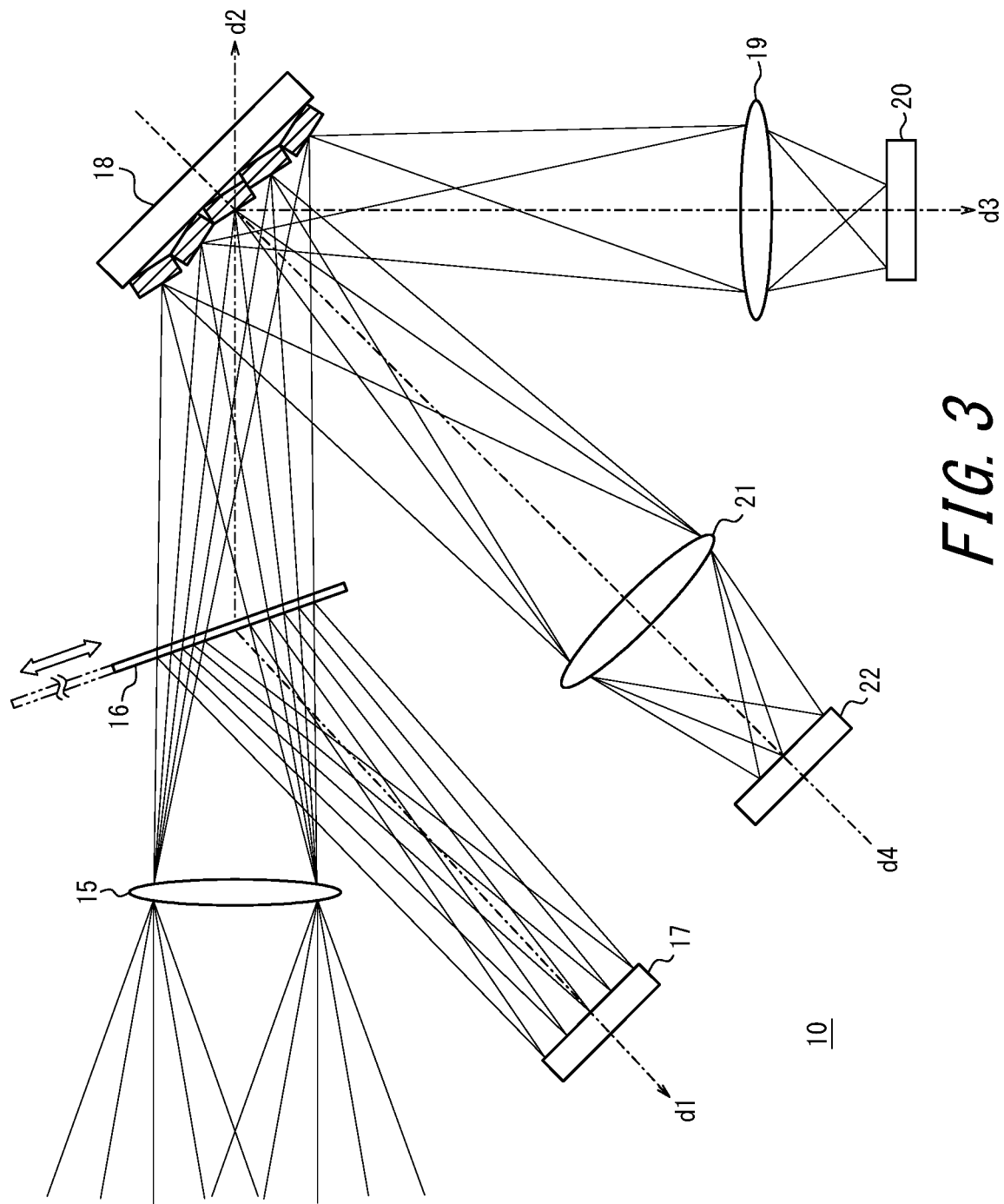
FIG. 3 is a diagram illustrating a modification of a separator in FIG. 2.

As an example, the separator 16 is pivotally supported so that the separation surface is rotatable about, as an axis, a straight line extending in a direction perpendicular to the optical axis of the upstream optical system 15, outside the traveling path. As a result of the separator 16 being rotated about the straight line as an axis, the separation surface can move between outside the traveling path of electromagnetic waves and inside the traveling path. As another example, the separator 16 is supported so as to be displaceable in parallel with the separation surface, as illustrated in FIG. 3. As a result of the separator 16 being displaced, the separation surface can move between outside the traveling path of electromagnetic waves and inside the traveling path.

In the first embodiment, the separator 16 in the separation state reflects a part of incident electromagnetic waves in the first direction d1, and transmits another part of the electromagnetic waves in the second direction d2. The separator 16 may transmit a part of incident electromagnetic waves in the first direction d1, and transmit another part of the electromagnetic waves in the second direction d2. The separator 16 may refract a part of incident electromagnetic waves in the first direction d1, and refract another part of the electromagnetic waves in the second direction d2. Examples of the separator 16 include a half mirror, a beam splitter, a dichroic mirror, a cold mirror, a hot mirror, a meta-surface, a deflection element, and a prism.

The first detector 17 is provided in the path of electromagnetic waves traveling in the first direction d1 from the separator 16. Moreover, the first detector 17 is provided at or near an image formation position of an image of the object "ob" by the upstream optical system 15, in the first direction d1 from the separator 16, the object being at a predetermined position distant from the upstream optical system 15. The first detector 17 detects electromagnetic waves traveling in the first direction d1 from the separator 16.

The first detector 17 may be located relative to the separator 16 so that a first traveling axis of electromagnetic waves traveling in the first direction d1 from the separator 16 is parallel to a first detection axis of the first detector 17. The first traveling axis is the central axis of electromagnetic waves that travel in the first direction d1 from the separator 16 and propagate while radiating. In the first embodiment, the first traveling axis is an axis obtained by extending the optical axis of the upstream optical system 15 to the separator 16 and bending the optical axis at the separator 16 so as to be parallel to the first direction d1. The first detection axis is an axis passing through the center of a detection surface of the first detector 17 and perpendicular to the detection surface.

The first detector 17 may be located so that the spacing between the first traveling axis and the first detection axis is less than or equal to a first spacing threshold. The first detector 17 may be located so that the first traveling axis and the first detection axis coincide. In the first embodiment, the first detector 17 is located so that the first traveling axis and the first detection axis coincide.

The first detector 17 may be located relative to the separator 16 so that a first angle between the first traveling axis and the detection surface of the first detector 17 is less than or equal to a first angle threshold or is a predetermined angle. In the first embodiment, the first detector 17 is located so that the first angle is 90°, as described above.

In the first embodiment, the first detector 17 is a passive sensor. More specifically, in the first embodiment, the first detector 17 includes an element array. For example, the first detector 17 includes an imaging element such as an image sensor or an imaging array, and captures an image formed by electromagnetic waves on the detection surface and generates image information corresponding to the imaged object "ob".

More specifically, in the first embodiment, the first detector 17 captures an image of visible light. The first detector 17 transmits the generated image information to the controller 14 as a signal.

The first detector 17 may capture an image other than visible light, such as an infrared, ultraviolet, or radio wave image. The first detector 17 may include a ranging sensor. With this structure, the electromagnetic wave detection apparatus 10 can acquire distance information in image form from the first detector 17. The first detector 17 may include a thermosensor or the like. With this structure, the electromagnetic wave detection apparatus 10 can acquire temperature information in image form from the first detector 17.

The switching unit 18 is provided in the path of electromagnetic waves traveling in the second direction d2 from the separator 16. Moreover, the switching unit 18 is provided at or near the primary image formation position of an image of the object "ob" by the upstream optical system 15, in the second direction d2 from the separator 16, the object being at a predetermined position distant from the upstream optical system 15.

In the first embodiment, the switching unit 18 is provided at the image formation position. The switching unit 18 comprises an action surface "as" on which electromagnetic waves passing through the upstream optical system 15 and the separator 16 are incident. The action surface "as" is composed of a plurality of switching elements "se" arranged in two dimensions. The action surface "as" is a surface for imposing an action such as reflection or transmission on the electromagnetic waves in at least one of the below-described first state and second state.

The switching unit 18 is capable of switching each switching element "se" between a first state in which electromagnetic waves incident on the action surface "as" are caused to travel in a third direction d3 and a second state in which the incident electromagnetic waves are caused to travel in a fourth direction d4. In the first embodiment, the first state is a first reflection state in which electromagnetic waves incident on the action surface "as" are reflected in the third direction d3, and the second state is a second reflection state in which electromagnetic waves incident on the action surface "as" are reflected in the fourth direction d4.

More specifically, in the first embodiment, the switching unit 18 includes, for each switching element "se", a reflective surface for reflecting electromagnetic waves. By changing the orientation of the reflective surface of each switching element "se", the switching unit 18 can switch the switching elements "se" between the first reflection state and the second reflection state.

In the first embodiment, for example, the switching unit 18 includes a digital micromirror device (DMD). The DMD can drive each of the micro reflective surfaces of the switching elements "se" constituting the action surface "as", to switch the reflective surface between a state of being inclined at +12° with respect to the action surface "as" and a state of being inclined at −12° with respect to the action surface "as". The action surface "as" is parallel to a plate surface of a substrate on which the micro reflective surfaces are placed in the DMD.

Figure 4:
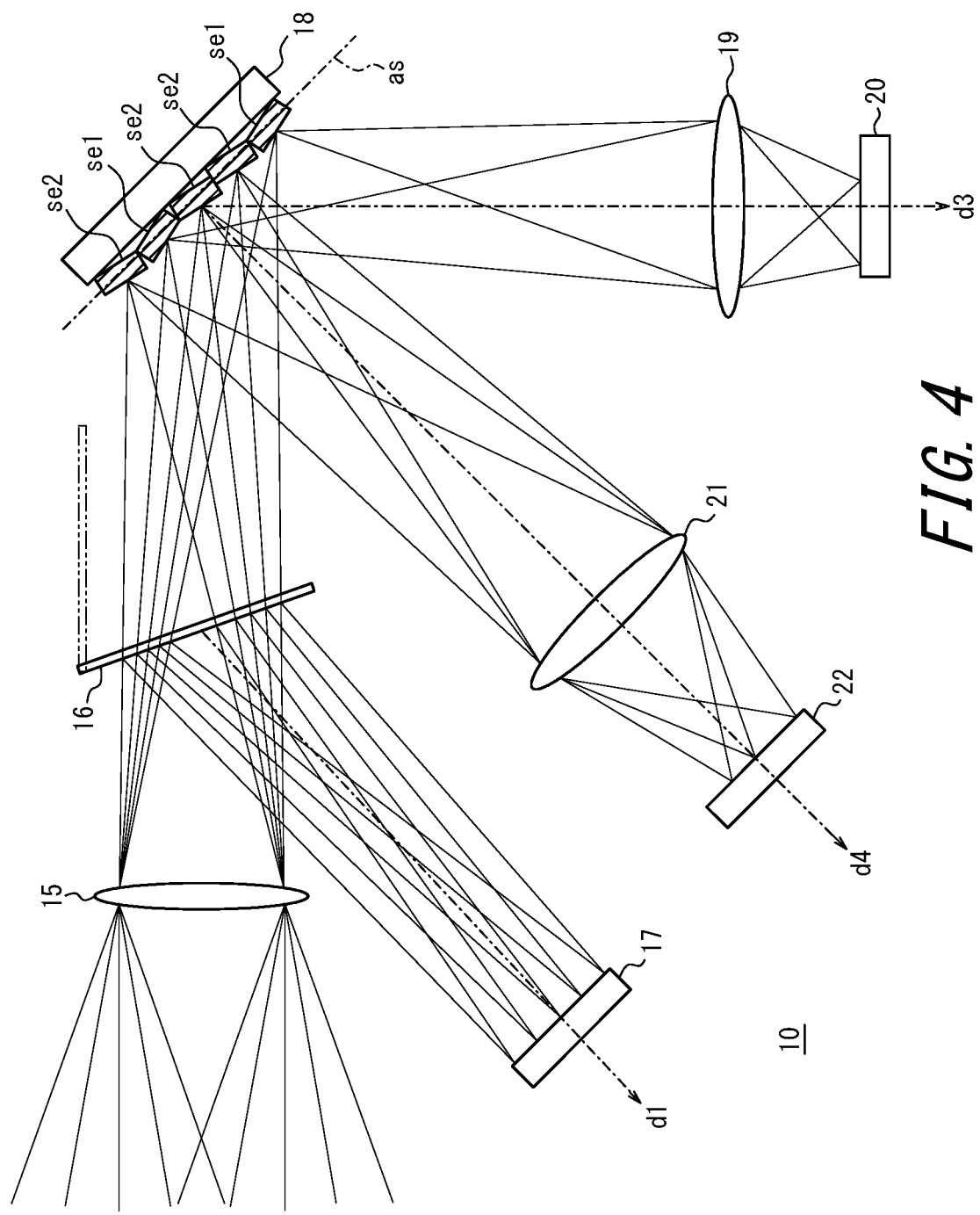
FIG. 4 is a state diagram of the electromagnetic wave detection apparatus for explaining the traveling direction of electromagnetic waves in each of a first state and a second state of each switching element in a switching unit in FIG. 2.

The switching unit 18 switches each switching element "se" between the first state and the second state, based on control by the below-described controller 14. For example, the switching unit 18 can simultaneously switch some switching elements "se1" to the first state to cause electromagnetic waves incident on the switching elements "se1" to travel in the third direction d3, and switch the other switching elements "se2" to the second state to cause electromagnetic waves incident on the switching elements "se2" to travel in the fourth direction d4, as illustrated in FIG. 4.

The first downstream optical system 19 is provided in the third direction d3 from the switching unit 18, as illustrated in FIG. 2. The first downstream optical system 19 includes, for example, at least one of a lens and a mirror. The first downstream optical system 19 forms an image of the object "ob" as electromagnetic waves for which the traveling direction has been changed by the switching unit 18.

The second detector 20 is provided in the path of electromagnetic waves traveling in the third direction d3 from the switching unit 18 and passing through the first downstream optical system 19. The second detector 20 detects electromagnetic waves that have passed through the first downstream optical system 19, that is, electromagnetic waves traveling in the third direction d3.

The second detector 20, together with the switching unit 18, may be located relative to the separator 16 so that a second traveling axis of electromagnetic waves that have traveled in the second direction d2 from the separator 16 and for which the traveling direction has been changed to the third direction d3 by the switching unit 18 is parallel to a second detection axis of the second detector 20. The second traveling axis is the central axis of electromagnetic waves that travel in the third direction d3 from the switching unit 18 and propagate while radiating. In the first embodiment, the second traveling axis is an axis obtained by extending the optical axis of the upstream optical system 15 to the switching unit 18 and bending the optical axis at the switching unit 18 so as to be parallel to the third direction d3. The second detection axis is an axis passing through the center of a detection surface of the second detector 20 and perpendicular to the detection surface.

The second detector 20, together with the switching unit 18, may be located so that the spacing between the second traveling axis and the second detection axis is less than or equal to a second spacing threshold. The second spacing threshold may be the same as or different from the first spacing threshold. The second detector 20, together with the first detector 17 and the switching unit 18, may be located so that the difference between the spacing between the first traveling axis and the first detection axis and the spacing between the second traveling axis and the second detection axis is less than or equal to a predetermined spacing difference (for example, the diameter of the detection surface of each of the first detector 17 and the second detector 20). The second detector 20 may be located so that the second traveling axis and the second detection axis coincide. In the first embodiment, the second detector 20 is located so that the second traveling axis and the second detection axis coincide.

The second detector 20, together with the switching unit 18, may be located relative to the separator 16 so that a second angle between the second traveling axis and the detection surface of the second detector 20 is less than or equal to a second angle threshold or is a predetermined angle. The second angle threshold may be the same as or different from the first angle threshold. The second detector 20, together with the first detector 17 and the switching unit 18, may be located so that the difference between the first angle and the second angle is less than or equal to a predetermined angle difference (for example, the Scheimpflug principle is satisfied). In the first embodiment, the second detector 20 is located so that the second angle is 90°, as described above.

In the first embodiment, the second detector 20 is an active sensor that detects reflected waves as a result of the object "ob" reflecting electromagnetic waves emitted from the irradiator 12 to the object "ob". In the first embodiment, the second detector 20 detects reflected waves as a result of the object "ob" reflecting electromagnetic waves emitted from the irradiator 12 and reflected by the reflector 13 to the object "ob". Electromagnetic waves emitted from the irradiator 12 are at least one of infrared, visible light, ultraviolet, and radio waves, and the type of electromagnetic waves detected by the second detector 20 is the same as or different from that detected by the first detector 17, as described later.

More specifically, in the first embodiment, the second detector 20 includes an element forming a ranging sensor. For example, the second detector 20 includes a single element such as an avalanche photodiode (APD), a photodiode (PD), or a ranging image sensor. The second detector 20 may include an element array such as an APD array, a PD array, a ranging imaging array, and a ranging image sensor.

In the first embodiment, the second detector 20 transmits, as a signal, detection information indicating that reflected waves from the subject have been detected, to the controller 14. More specifically, the second detector 20 detects electromagnetic waves in the infrared band.

For the second detector 20, it is sufficient that the foregoing structure including a single element forming a ranging sensor is able to detect electromagnetic waves, and it is not necessary to form an image on its detection surface. Hence, the second detector 20 need not be provided at a secondary image formation position which is an image formation position of the first downstream optical system 19. With this structure, the second detector 20 may be located anywhere in the path of electromagnetic waves traveling in the third direction d3 from the switching unit 18 and passing through the first downstream optical system 19, as long as electromagnetic waves from all angles of view can be incident on its detection surface.

The second downstream optical system 21 is provided in the fourth direction d4 from the switching unit 18. The second downstream optical system 21 includes, for example, at least one of a lens and a mirror. The second downstream optical system 21 forms an image of the object "ob" as electromagnetic waves for which the traveling direction has been changed by the switching unit 18.

The third detector 22 is provided in the path of electromagnetic waves traveling in the fourth direction d4 from the switching unit 18 and passing through the second downstream optical system 21. The third detector 22 detects electromagnetic waves that have passed through the second downstream optical system 21, that is, electromagnetic waves traveling in the fourth direction d4.

The third detector 22, together with the switching unit 18, may be located relative to the separator 16 so that a third traveling axis of electromagnetic waves that have traveled in the second direction d2 from the separator 16 and for which the traveling direction has been changed to the fourth direction d4 by the switching unit 18 is parallel to a third detection axis of the third detector 22. The third traveling axis is the central axis of electromagnetic waves that travel in the fourth direction d4 from the switching unit 18 and propagate while radiating. In the first embodiment, the third traveling axis is an axis obtained by extending the optical axis of the upstream optical system 15 to the switching unit 18 and bending the optical axis at the switching unit 18 so as to be parallel to the fourth direction d4. The third detection axis is an axis passing through the center of a detection surface of the third detector 22 and perpendicular to the detection surface.

The third detector 22, together with the switching unit 18, may be located so that the spacing between the third traveling axis and the third detection axis is less than or equal to a third spacing threshold. The third spacing threshold may be the same as or different from the first spacing threshold or the second spacing threshold. The third detector 22, together with the first detector 17, the switching unit 18, and the second detector 20, may be located so that the difference between each of the spacing between the first traveling axis and the first detection axis and the spacing between the second traveling axis and the second detection axis and the spacing between the third traveling axis and the third detection axis is less than or equal to a predetermined spacing difference. The third detector 22 may be located so that the third traveling axis and the third detection axis coincide. In the first embodiment, the third detector 22 is located so that the third traveling axis and the third detection axis coincide.

The third detector 22, together with the switching unit 18, may be located relative to the separator 16 so that a third angle between the third traveling axis and the detection surface of the third detector 22 is less than or equal to a third angle threshold or is a predetermined angle. The third angle threshold may be the same as or different from the first angle threshold or the second angle threshold. The third detector 22, together with the first detector 17, the switching unit 18, and the second detector 20, may be located so that the difference between each of the first angle and the second angle and the third angle is less than or equal to a predetermined angle difference. In the first embodiment, the third detector 22 is located so that the third angle is 90°, as described above.

In the first embodiment, the third detector 22 is a passive sensor. The type of electromagnetic waves detected by the third detector 22 is the same as or different from that detected by the first detector 17 or the second detector 20. More specifically, in the first embodiment, the third detector 22 includes an element array. For example, the third detector 22 includes a thermosensor, and detects temperature resulting from electromagnetic waves forming an image on the detection surface and generates temperature information for the object "ob" in image form. The third detector 22 transmits the generated temperature information to the controller 14 as a signal.

The third detector 22 may detect an image other than infrared, such as an image of visible light, ultraviolet, or radio waves. The third detector 22 may include an image sensor. With this structure, the electromagnetic wave detection apparatus 10 can acquire image information from the third detector 22. With the structure of acquiring image information from the third detector 22, for example, the image information can be acquired with an exposure time different from that of the first detector 17 in order to synthesize a high dynamic range (HDR) image. The third detector 22 may include a ranging sensor or the like. With this structure, the electromagnetic wave detection apparatus 10 can acquire distance information in image form from the third detector 22.

The irradiator 12 radiates at least one of infrared, visible light, ultraviolet, and radio waves, as illustrated in FIG. 1. In the first embodiment, the irradiator 12 radiates infrared. The irradiator 12 irradiates the object "ob" with the radiated electromagnetic waves either directly or indirectly through the reflector 13. In the first embodiment, the irradiator 12 irradiates the object "ob" with the radiated electromagnetic waves indirectly through the reflector 13.

In the first embodiment, the irradiator 12 radiates electromagnetic waves of narrow width, e.g. 0.5°, in beam form. In the first embodiment, the irradiator 12 can radiate electromagnetic waves in pulse form. For example, the irradiator 12 includes a light emitting diode (LED), a laser diode (LD), and the like. The irradiator 12 switches between radiating electromagnetic waves and stopping the radiation, based on control by the below-described controller 14.

The reflector 13 reflects the electromagnetic waves radiated from the irradiator 12 while changing the direction, to change the irradiation position at which the object "ob" is irradiated with the electromagnetic waves. That is, the reflector 13 scans the object "ob" by the electromagnetic waves radiated from the irradiator 12. Thus, in the first embodiment, the second detector 20 forms a scanning ranging sensor together with the reflector 13. The reflector 13 scans the object "ob" one-dimensionally or two-dimensionally. In the first embodiment, the reflector 13 scans the object "ob" two-dimensionally.

The reflector 13 is configured so that at least part of the irradiation region of the electromagnetic waves radiated from the irradiator 12 and reflected by the reflector 13 is included in the electromagnetic wave detection range of the electromagnetic wave detection apparatus 10. Hence, at least part of the electromagnetic waves with which the object "ob" is irradiated through the reflector 13 is detectable by the electromagnetic wave detection apparatus 10.

In the first embodiment, the reflector 13 is configured so that at least part of the irradiation region of the electromagnetic waves radiated from the irradiator 12 and reflected by the reflector 13 is included in the detection range in the second detector 20. Hence, in the first embodiment, at least part of the electromagnetic waves with which the object "ob" is irradiated through the reflector 13 is detectable by the second detector 20.

The reflector 13 includes, for example, a microelectromechanical systems (MEMS) mirror, a polygon mirror, a galvanometer mirror, or the like. In the first embodiment, the reflector 13 includes a MEMS mirror.

The reflector 13 changes the direction in which the electromagnetic waves are reflected, based on control by the below-described controller 14. For example, the reflector 13 may include an angle sensor such as an encoder, and may notify the controller 14 of the angle detected by the angle sensor as direction information indicating the direction in which the electromagnetic waves are reflected. With this structure, the controller 14 can calculate the irradiation position based on the direction information acquired from the reflector 13. The controller 14 can also calculate the irradiation position based on a drive signal that is input in order to cause the reflector 13 to change the direction in which the electromagnetic waves are reflected.

The controller 14 includes one or more processors and memory. The processors may include at least one of a general-purpose processor that performs a specific function by reading a specific program and a dedicated processor dedicated to a specific process. The dedicated processor may include an application specific integrated circuit (ASIC). Each processor may include a programmable logic device (PLD). The PLD may include a field-programmable gate array (FPGA). The controller 14 may include at least one of a system on a chip (SoC) and a system in a package (SiP) in which one or more processors cooperate with each other.

The controller 14 acquires information about the surroundings of the electromagnetic wave detection apparatus 10, based on the electromagnetic waves detected by each of the first detector 17, the second detector 20, and the third detector 22. Examples of the information about the surroundings include image information, distance information, and temperature information. In the first embodiment, the controller 14 acquires, as image information, the electromagnetic waves detected by the first detector 17 as an image, as described above. In the first embodiment, the controller 14 acquires distance information of the irradiation position by the irradiator 12 based on the detection information of the second detector 20 using a time-of-flight (ToF) method, as described later. In the first embodiment, the controller 14 acquires the electromagnetic waves detected by the third detector 22, as temperature information.

Figure 5:
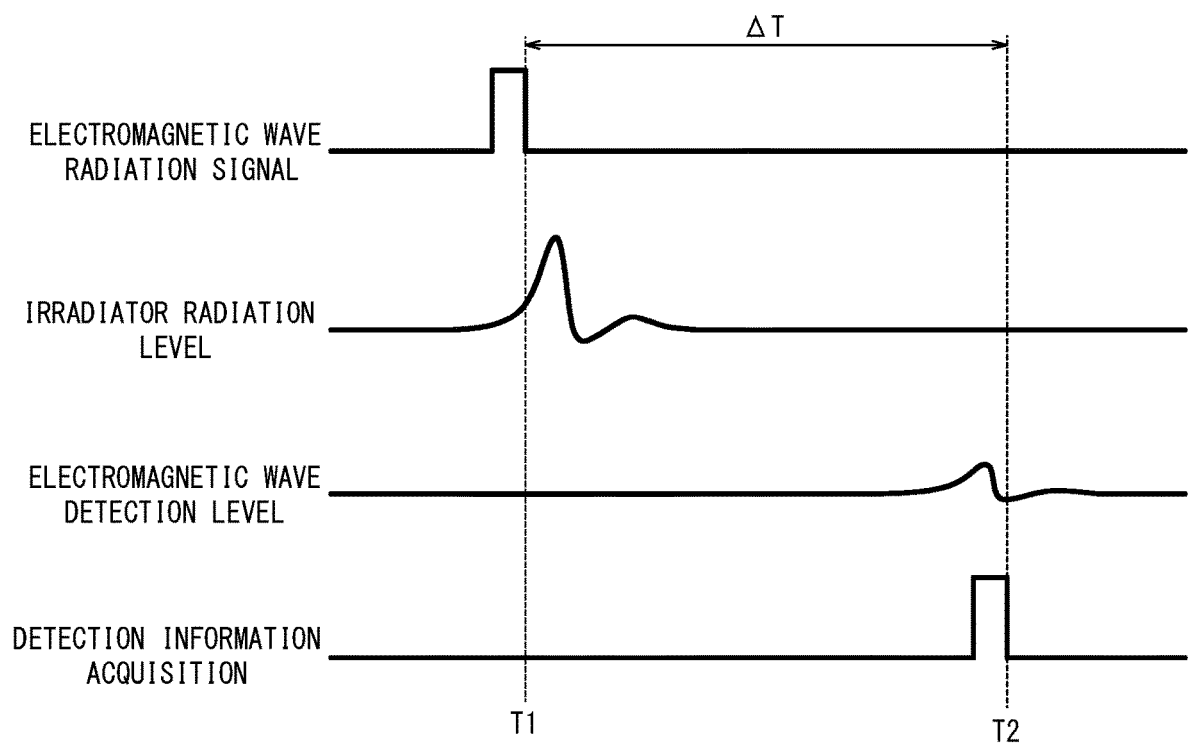
FIG. 5 is a timing chart illustrating timing of electromagnetic wave radiation and timing of electromagnetic wave detection, for explaining the principle of ranging by a ranging sensor composed of an irradiator and a controller in FIG. 1 and a second detector in FIG. 2.

As illustrated in FIG. 5, the controller 14 inputs an electromagnetic wave radiation signal to the irradiator 12 to cause the irradiator 12 to radiate electromagnetic waves in pulse form (see "electromagnetic wave radiation signal"). The irradiator 12 emits electromagnetic waves based on the input electromagnetic wave radiation signal (see "irradiator radiation level"). Electromagnetic waves radiated by the irradiator 12 and reflected by the reflector 13 to be applied to a given irradiation region are reflected in the irradiation region. The controller 14 switches at least some of the switching elements "se" in the image formation region on the switching unit 18 formed by the upstream optical system 15 from the reflected waves in the irradiation region to the first state, and the other switching elements "se" to the second state. The second detector 20, upon detecting the electromagnetic waves reflected in the irradiation region (see "electromagnetic wave detection level"), provides the detection information to the controller 14, as described above.

The controller 14 includes, for example, a time measurement LSI (large scale integrated circuit), and measures a time period $\Delta T$ from time T1 at which the irradiator 12 radiates the electromagnetic waves to time T2 at which the detection information is acquired (see "detection information acquisition"). The controller 14 multiplies the time period $\Delta T$ by the speed of light and divides the result by 2, to calculate the distance to the irradiation position. Here, the controller 14 calculates the irradiation position based on the direction information acquired from the reflector 13 or the drive signal output from the controller 14 to the reflector 13, as described above. The controller 14, while changing the irradiation position, calculates the distance to each irradiation position, thus generating distance information in image form.

In the first embodiment, the electromagnetic wave detection system 11 comprises a structure in which distance information is generated by direct ToF whereby laser light is emitted and the time until the light returns is directly measured, as described above. However, the electromagnetic wave detection system 11 is not limited to such a structure. For example, the electromagnetic wave detection system 11 may generate distance information by flash ToF whereby electromagnetic waves are emitted at regular intervals and the time to the return is indirectly measured from the phase difference between the emitted electromagnetic waves and the returned electromagnetic waves. The electromagnetic wave detection system 11 may generate distance information by other ToF methods, such as phased ToF.

The electromagnetic wave detection apparatus 10 according to the first embodiment having such a structure is capable of separating incident electromagnetic waves such that they travel in the first direction d1 and the second direction d2, and changing the traveling direction of electromagnetic waves traveling in the second direction d2 to the third direction d3. With this structure, the electromagnetic wave detection apparatus 10 can align the optical axis of the upstream optical system 15 to the first traveling axis which is the central axis of electromagnetic waves traveling in the first direction d1 and the second traveling axis which is the central axis of electromagnetic waves traveling in the third direction d3. Accordingly, the electromagnetic wave detection apparatus 10 can reduce deviation between the optical axes of the first detector 17 and the second detector 20. The electromagnetic wave detection apparatus 10 can thus reduce deviation between the first detection axis and the second detection axis. The electromagnetic wave detection apparatus 10 can thus reduce deviation between the coordinate systems in the detection results by the first detector 17 and the second detector 20. Such structures and effects also apply to the below-described electromagnetic wave detection apparatus according to a second embodiment.

The electromagnetic wave detection apparatus 10 according to the first embodiment is capable of switching between the separation state in which the incident electromagnetic waves are separated to travel in the first direction d1 and the second direction d2 and the non-separation state in which the incident electromagnetic waves are not separated. With this structure, the electromagnetic wave detection apparatus 10 can prevent the decrease in the quantity of light in the separation state, by switching to the non-separation state.

In the electromagnetic wave detection apparatus 10 according to the first embodiment, incident electromagnetic waves travel in the second direction d2 in the non-separation state. With this structure, the electromagnetic wave detection apparatus 10 can reduce the decrease in the intensity of incident electromagnetic waves by the separator 16, by switching to the non-separation state. Therefore, for example in a situation in which highly sensitive detection of electromagnetic waves by the second detector 20 or the third detector 22 is desirable, the electromagnetic wave detection apparatus 10 can perform the detection without increasing the intensity of electromagnetic waves radiated from the irradiator 12.

The electromagnetic wave detection apparatus 10 according to the first embodiment is capable of switching some of the switching elements "se" in the switching unit 18 to the first state and the other switching elements "se" to the second state. With this structure, the electromagnetic wave detection apparatus 10 can detect information based on electromagnetic waves for each part of the object "ob" emitting electromagnetic waves incident on each switching element "se", by the second detector 20. Such structures and effects also apply to the below-described electromagnetic wave detection apparatus according to the second embodiment.

The electromagnetic wave detection apparatus 10 according to the first embodiment includes the third detector 22 that detects electromagnetic waves traveling in the fourth direction d4 from the switching unit 18. With this structure, the electromagnetic wave detection apparatus 10 can align the optical axis of the upstream optical system 15 to the first traveling axis which is the central axis of electromagnetic waves traveling in the first direction d1, the second traveling axis which is the central axis of electromagnetic waves traveling in the third direction d3, and the third traveling axis which is the central axis of electromagnetic waves traveling in the fourth direction d4. Accordingly, the electromagnetic wave detection apparatus 10 can reduce deviation among the optical axes of the first detector 17, the second detector 20, and the third detector 22. The electromagnetic wave detection apparatus 10 can thus reduce deviation among the first detection axis, the second detection axis, and the third detection axis. The electromagnetic wave detection apparatus 10 can thus reduce deviation among the coordinate systems in the detection results by the first detector 17, the second detector 20, and the third detector 22.

The electromagnetic wave detection apparatus 10 according to the first embodiment is capable of switching some of the switching elements "se" in the switching unit 18 to the first state and the other switching elements "se" to the second state. With this structure, in the electromagnetic wave detection apparatus 10, some of the switching elements "se" can cause electromagnetic waves to travel to the second detector 20 and simultaneously the other switching elements "se" can cause electromagnetic waves to travel to the third detector 22. The electromagnetic wave detection apparatus 10 can thus acquire information about different regions simultaneously. The electromagnetic wave detection apparatus 10 can, for example, shorten the time required to acquire distance information in image form.

In the electromagnetic wave detection apparatus 10 according to the first embodiment, the first detector 17, the switching unit 18, and the second detector 20 are located relative to the separator 16 so that the first traveling axis is parallel to the first detection axis and the second traveling axis is parallel to the second detection axis. With this structure, the electromagnetic wave detection apparatus 10 can reduce deviation between the first detection axis and the second detection axis, and homogenize the image formation state of electromagnetic waves on the detection surface regardless of the distance from the traveling axis. The electromagnetic wave detection apparatus 10 can thus acquire information about the surroundings in a homogeneous image formation state, without the controller 14 performing information processing to homogenize the image formation state. Such structures and effects also apply to the below-described electromagnetic wave detection apparatus according to the second embodiment.

In the electromagnetic wave detection apparatus 10 according to the first embodiment, the first detector 17 is located relative to the separator 16 such that the spacing between the first traveling axis and the first detection axis is less than or equal to the first spacing threshold, and the switching unit 18 and the second detector 20 are located relative to the separator 16 such that the spacing between the second traveling axis and the second detection axis is less than or equal to the second spacing threshold. With this structure, the electromagnetic wave detection apparatus 10 can further reduce deviation between the first detection axis and the second detection axis. Such structures and effects also apply to the below-described electromagnetic wave detection apparatus according to the second embodiment.

In the electromagnetic wave detection apparatus 10 according to the first embodiment, the first detector 17, the switching unit 18, and the second detector 20 are located relative to the separator 16 such that the difference between the spacing between the first traveling axis and the first detection axis and the spacing between the second traveling axis and the second detection axis is less than or equal to the predetermined spacing difference. With this structure, the electromagnetic wave detection apparatus 10 can further reduce deviation between the first detection axis and the second detection axis. Such structures and effects also apply to the below-described electromagnetic wave detection apparatus according to the second embodiment.

In the electromagnetic wave detection apparatus 10 according to the first embodiment, the first detector 17, the switching unit 18, and the second detector 20 are located relative to the separator 16 such that the first traveling axis and the first detection axis coincide and the second traveling axis and the second detection axis coincide. With this structure, the electromagnetic wave detection apparatus 10 can further reduce deviation between the first detection axis and the second detection axis. Such structures and effects also apply to the below-described electromagnetic wave detection apparatus according to the second embodiment.

In the electromagnetic wave detection apparatus 10 according to the first embodiment, the first detector 17, the switching unit 18, and the second detector 20 are located relative to the separator 16 such that the first angle is less than or equal to the first angle threshold or is the predetermined angle and the second angle is less than or equal to the second angle threshold or is the predetermined angle. With this structure, the electromagnetic wave detection apparatus 10 can reduce deviation between the first detection axis and the second detection axis, and reduce inhomogeneity of the image formation state of electromagnetic waves on the detection surface depending on the distance from the traveling axis. The electromagnetic wave detection apparatus 10 can thus reduce the information processing load for homogenizing the image formation state in the controller 14. Such structures and effects also apply to the below-described electromagnetic wave detection apparatus according to the second embodiment.

In the electromagnetic wave detection apparatus 10 according to the first embodiment, the first detector 17, the switching unit 18, and the second detector 20 are located relative to the separator 16 such that the difference between the first angle and the second angle is less than or equal to the predetermined angle difference. With this structure, the electromagnetic wave detection apparatus 10 can further reduce deviation between the optical axes of the first detector 17 and the second detector 20. Such structures and effects also apply to the below-described electromagnetic wave detection apparatus according to the second embodiment.

In the electromagnetic wave detection apparatus 10 according to the first embodiment, the third detector 22, together with the switching unit 18, is located relative to the separator 16 such that the third traveling axis is parallel to the third detection axis. With this structure, the electromagnetic wave detection apparatus 10 can reduce deviation among the first detection axis, the second detection axis, and the third detection axis, and homogenize the image formation state of electromagnetic waves on the detection surface of the third detector 22 regardless of the distance from the third traveling axis. The electromagnetic wave detection apparatus 10 can thus acquire information about the surroundings in a homogeneous image formation state, without the controller 14 performing information processing for homogenizing the image formation state.

In the electromagnetic wave detection apparatus 10 according to the first embodiment, the third detector 22, together with the switching unit 18, is located relative to the separator 16 such that the spacing between the third traveling axis and the third detection axis is less than or equal to the third spacing threshold. With this structure, the electromagnetic wave detection apparatus 10 can further reduce deviation of the third detection axis with respect to the first detection axis and the second detection axis.

In the electromagnetic wave detection apparatus 10 according to the first embodiment, the first detector 17, the switching unit 18, the second detector 20, and the third detector 22 are located relative to the separator 16 such that the difference between the spacing between the third traveling axis and the third detection axis and each of the spacing between the first traveling axis and the first detection axis and the spacing between the second traveling axis and the second detection axis is less than or equal to the predetermined spacing difference. With this structure, the electromagnetic wave detection apparatus 10 can further reduce deviation of the third detection axis with respect to the first detection axis and the second detection axis.

In the electromagnetic wave detection apparatus 10 according to the first embodiment, the third detector 22, together with the switching unit 18, is located relative to the separator 16 such that the third traveling axis and the third detection axis coincide. With this structure, the electromagnetic wave detection apparatus 10 can further reduce deviation of the third detection axis with respect to the first detection axis and the second detection axis.

In the electromagnetic wave detection apparatus 10 according to the first embodiment, the third detector 22, together with the switching unit 18, is located relative to the separator 16 such that the third angle is less than or equal to the third angle threshold or is the predetermined angle. With this structure, the electromagnetic wave detection apparatus 10 can reduce deviation among the first detection axis, the second detection axis, and the third detection axis, and reduce inhomogeneity of the image formation state of electromagnetic waves on the detection surface of the third detector 22 depending on the distance from the third traveling axis. The electromagnetic wave detection apparatus 10 can thus reduce the information processing load for homogenizing the image formation state in the controller 14.

In the electromagnetic wave detection apparatus 10 according to the first embodiment, the first detector 17, the switching unit 18, the second detector 20, and the third detector 22 are located relative to the separator 16 such that the difference between the third angle and each of the first angle and the second angle is less than or equal to the predetermined angle difference. With this structure, the electromagnetic wave detection apparatus 10 can further reduce deviation of the optical axis of the third detector 22 with respect to the first detector 17 and the second detector 20.

An electromagnetic wave detection apparatus according to the second embodiment of the present disclosure will be described below. The second embodiment is different from the first embodiment in respect to the structure of the second downstream optical system. The second embodiment will be described below, mainly focusing on the differences from the first embodiment. Parts having the same structures as those in the first embodiment are given the same reference signs.

Figure 6:
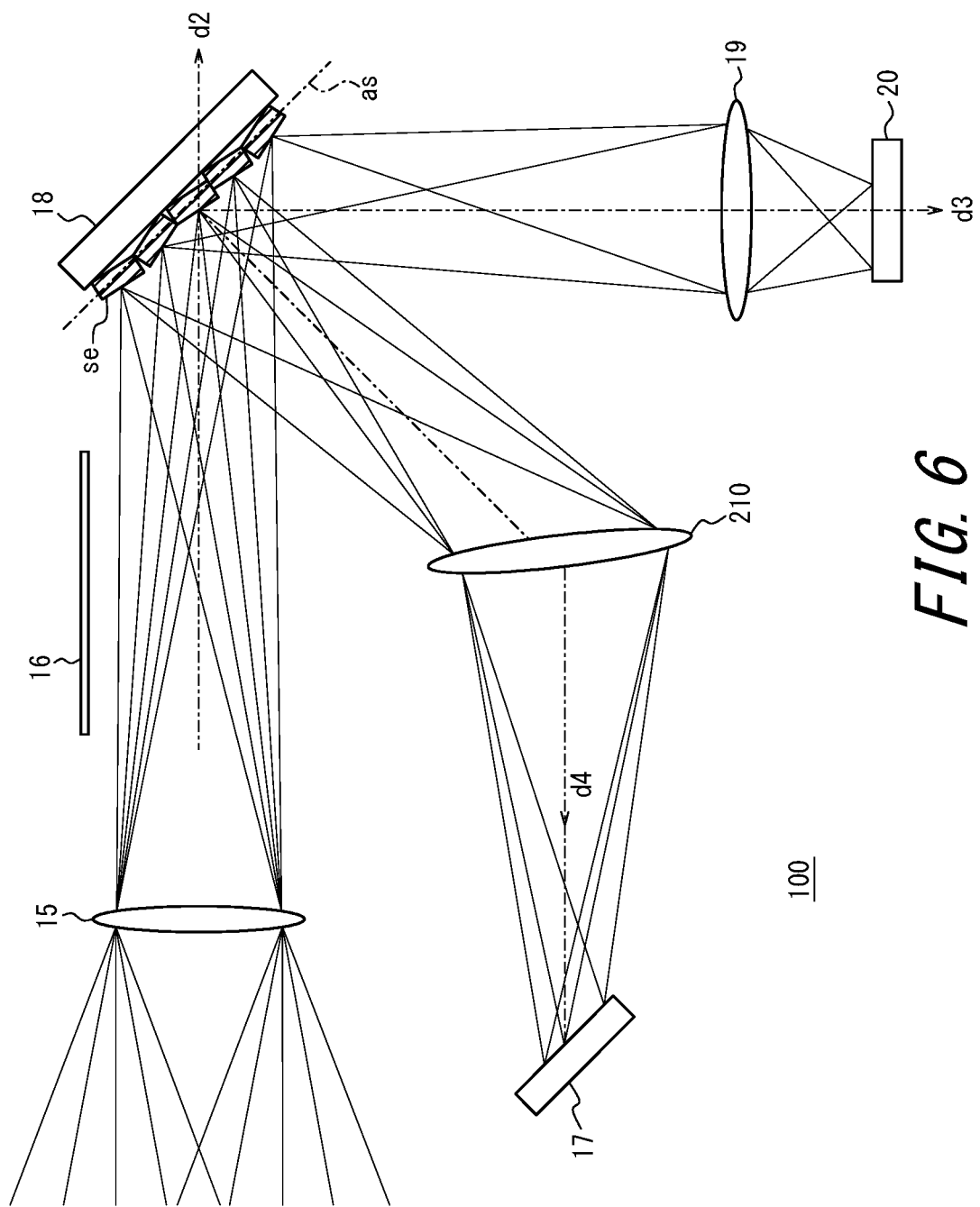
FIG. 6 is a diagram illustrating a schematic structure of an electromagnetic wave detection apparatus according to a second embodiment.

An electromagnetic wave detection apparatus 100 according to the second embodiment includes an upstream optical system 15, a separator 16, a first detector 17, a switching unit 18, a first downstream optical system 19, a second downstream optical system 210, and a second detector 20, as illustrated in FIG. 6. Components other than the electromagnetic wave detection apparatus 100 in the electromagnetic wave detection system 11 according to the second embodiment are the same as those in the first embodiment. The upstream optical system 15, the separator 16, the first detector 17, the switching unit 18, the first downstream optical system 19, and the second detector 20 in the second embodiment have the same structures and functions as those in the first embodiment.

In the second embodiment, the second downstream optical system 210 is provided in the fourth direction d4 from the switching unit 18, as in the first embodiment. The second downstream optical system 210 includes at least a mirror.

The second downstream optical system 210 may include a lens. Unlike in the first embodiment, the second downstream optical system 210 reflects electromagnetic waves for which the traveling direction has been changed by the switching unit 18, toward the first detector 17. The second downstream optical system 210 also forms, at the first detector 17, an image of the object "ob" as the electromagnetic waves for which the traveling direction has been changed by the switching unit 18.

Figure 7:
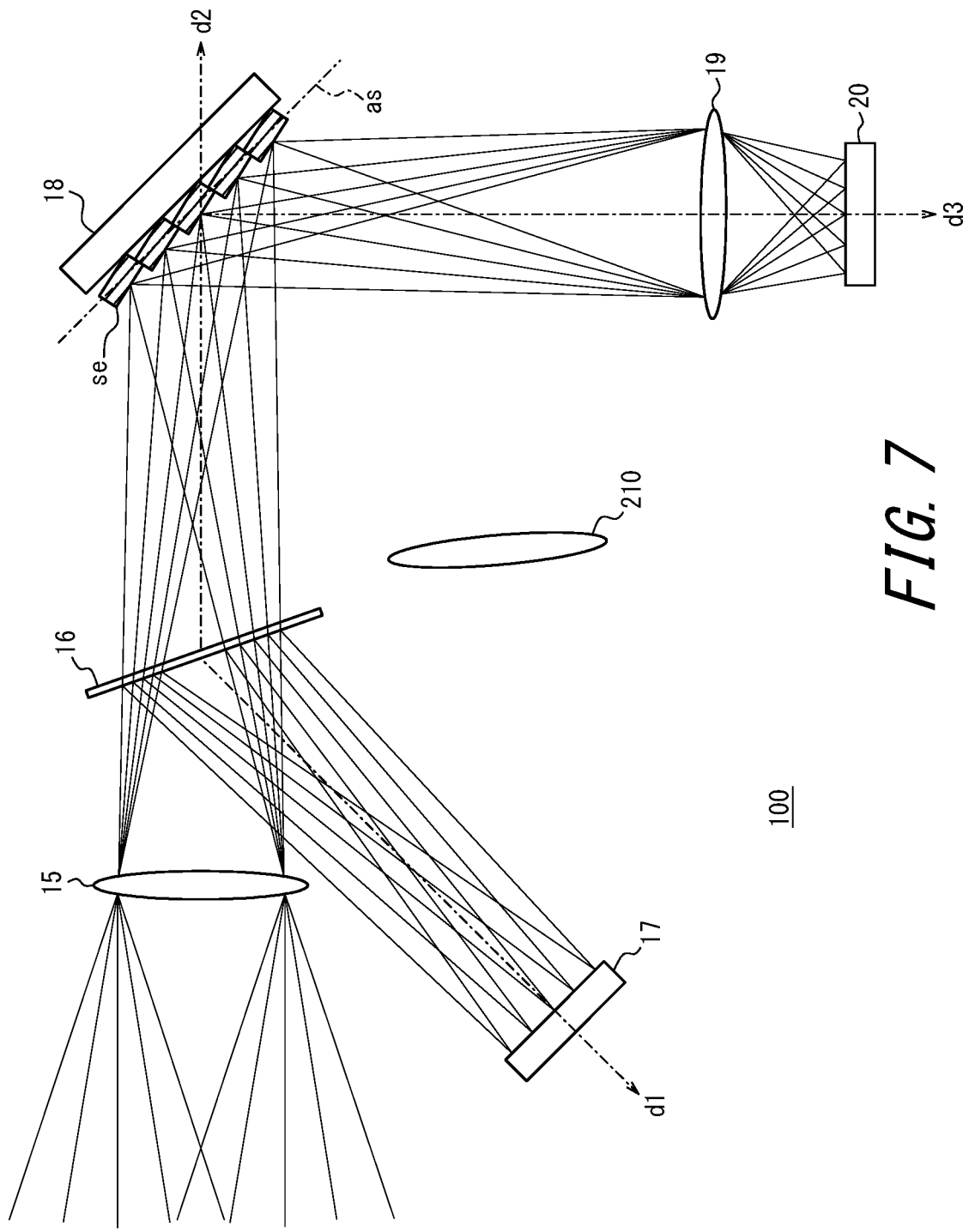
FIG. 7 is a state diagram of the electromagnetic wave detection apparatus for explaining the traveling direction of electromagnetic waves in the case of switching a separator in FIG. 6 to a separation state.

In the second embodiment, while the separator 16 is in the non-separation state, the controller 14 permits switching of the switching elements "se" to the second state, to cause the first detector 17 to detect electromagnetic waves traveling in the fourth direction d4. While the separator 16 is in the separation state, the controller 14 prohibits switching of the switching elements "se" to the second state, to cause electromagnetic waves incident on the action surface "as" to travel only in the third direction d3, as illustrated in FIG. 7. In the second embodiment, the controller 14 controls switching of the separator 16 between the non-separation state and the separation state as illustrated in FIGS. 6 and 7, for example by driving an actuator.

As described above, in the electromagnetic wave detection apparatus 100 according to the second embodiment, the first detector 17 can detect not only electromagnetic waves traveling in the first direction d1 but also electromagnetic waves traveling in the fourth direction d4. With this structure, the electromagnetic wave detection apparatus 100 can detect electromagnetic waves traveling in the first direction d1 and the fourth direction d4 and acquire information about the surroundings based on the these detection results, with no need for the third detector 22.

While some embodiments of the present disclosure have been described above with reference to the drawings, various changes or modifications may be easily made by those of ordinary skill in the art based on the present disclosure. Such various changes or modifications are therefore included in the scope of the present disclosure.

Figure 8:
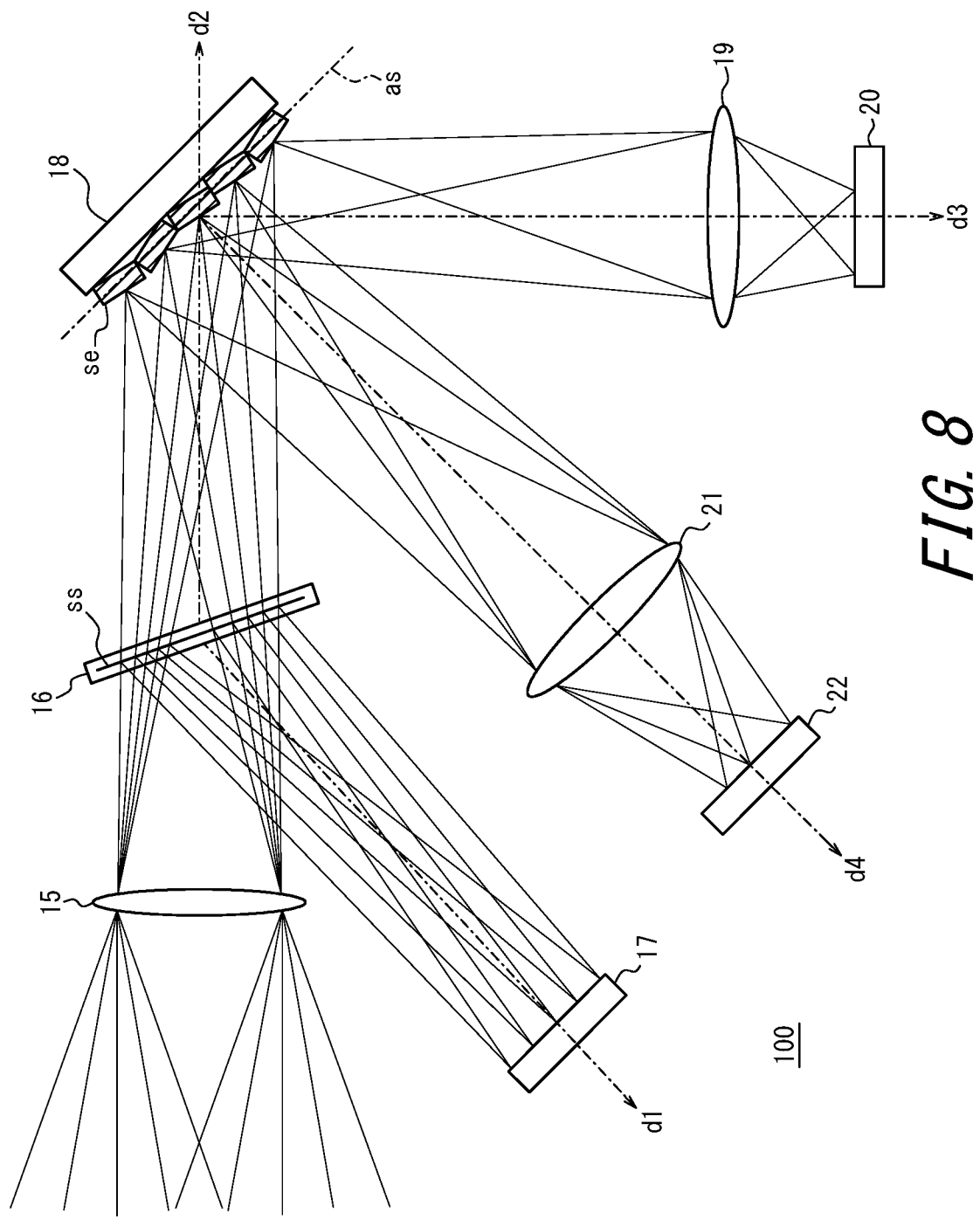
FIG. 8 is a diagram illustrating a schematic structure of a modification of the electromagnetic wave detection apparatus according to the first embodiment.
Figure 9:
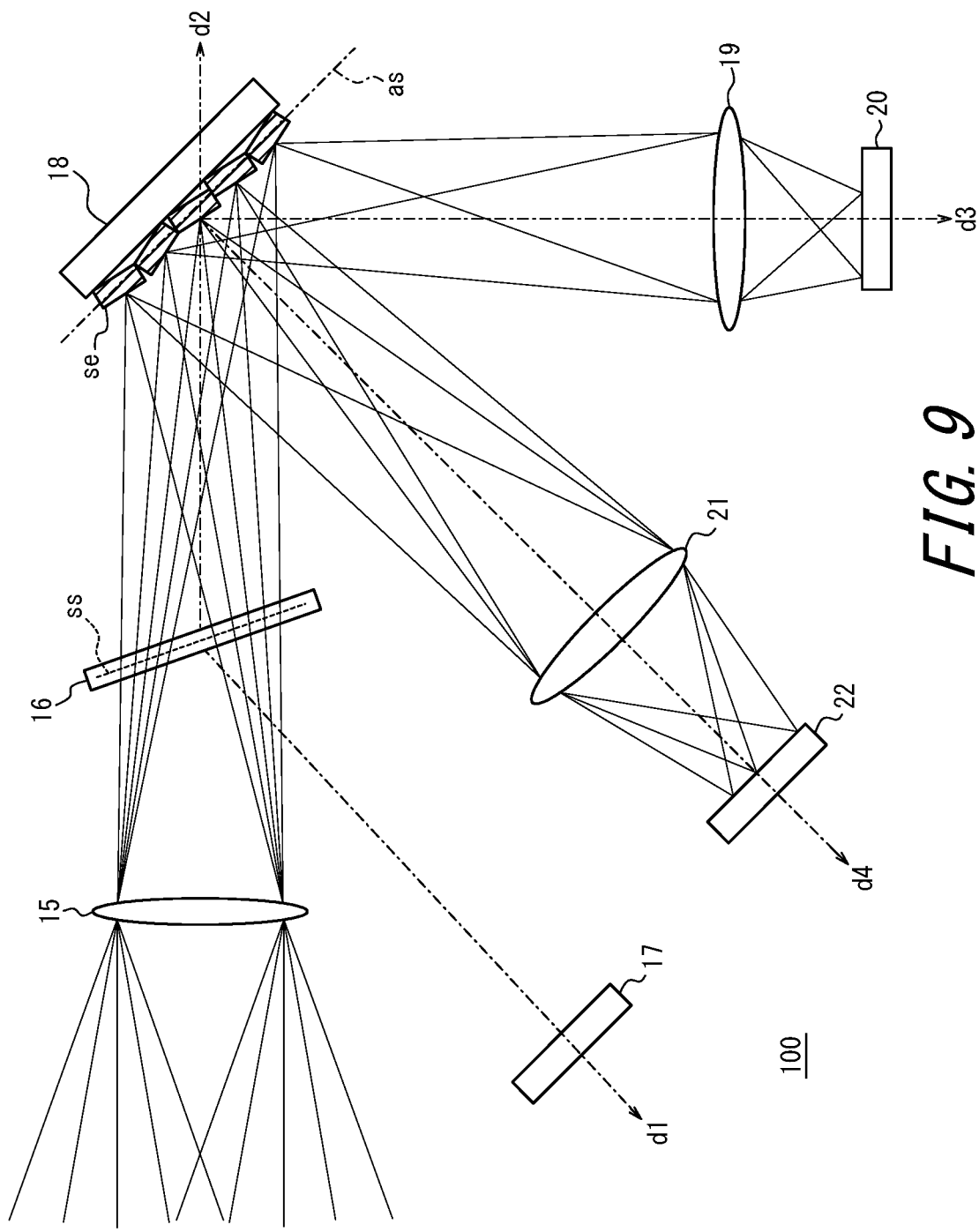
FIG. 9 is a state diagram of the electromagnetic wave detection apparatus for explaining the traveling direction of electromagnetic waves in the case of switching a separator in FIG. 8 to a non-separation state.

For example, although the separator 16 can switch the separation surface between the state in which it is not located in the traveling path of electromagnetic waves and the state in which it is located in the traveling path by moving the separation surface between outside the traveling path of electromagnetic waves and inside the traveling path in the first and second embodiments, the switching of the state of the separation surface is not limited to such a structure. Even in the case where a separator 16 comprising a separation surface "ss" switchable between an appearance state and a non-appearance state is used as illustrated in FIGS. 8 and 9, effects similar to those of the first and second embodiments can be achieved. The appearance state is a state in which the separation surface "ss" appears in the separator 16. The non-appearance state is a state in which the separation surface "ss" does not appear in the separator 16. The separator 16 switches from the non-separation state to the separation state, by switching the separation surface "ss" from the non-appearance state in which the separation surface "ss" does not appear to the appearance state in which the separation surface "ss" appears. The separator 16 switches from the separation state to the non-separation state, by switching the separation surface "ss" from the appearance state to the non-appearance state. Examples of such a separator 16 include instant dimming glass and liquid crystal dimming glass.

Although the irradiator 12, the reflector 13, and the controller 14 constitute the electromagnetic wave detection system 11 together with the electromagnetic wave detection apparatus 10 or 100 in the first and second embodiments, the electromagnetic wave detection apparatus 10 or 100 may include at least one of the irradiator 12, the reflector 13, and the controller 14.

Although the switching unit 18 can switch the traveling direction of electromagnetic waves incident on the action surface "as" between two directions in the first embodiment, the traveling direction may be switched not between two directions but among three or more directions. Although the switching unit 18 can switch the traveling direction of electromagnetic waves incident on the action surface "as" among three directions in the second embodiment, the traveling direction may be switched among four or more directions.

Although the first state and the second state in the switching unit 18 in the first embodiment are respectively the first reflection state in which electromagnetic waves incident on the action surface "as" are reflected in the third direction d3 and the second reflection state in which the electromagnetic waves are reflected in the fourth direction d4, the switching unit 18 is not limited to such.

For example, the second state may be a transmission state in which electromagnetic waves incident on the action surface "as" are transmitted to travel in the second direction d2. More specifically, the switching unit 18 may include a shutter comprising a reflective surface for reflecting electromagnetic waves, for each switching element "se". The switching unit 18 comprising such a structure can switch each switching element "se" between a transmission state in which electromagnetic waves traveling in the second direction d2 are transmitted in the third direction d3 and a reflection state in which the electromagnetic waves are reflected in the fourth direction d4, by opening or closing the shutters of the switching elements "se".

An example of the switching unit 18 having such a structure is a switching unit including a MEMS shutter in which a plurality of shutters that are openable and closable are arranged in an array. Another example of the switching unit 18 having such a structure is a switching unit including a liquid crystal shutter capable of switching between a reflection state in which electromagnetic waves are reflected and a transmission state in which electromagnetic waves are transmitted depending on the liquid crystal orientation. The switching unit 18 with this structure can switch each switching element "se" between the reflection state and the transmission state by switching the liquid crystal orientation of the switching element "se".

Although the electromagnetic wave detection system 11 in the first and second embodiments has a structure in which the second detector 20 functions as a scanning active sensor together with the reflector 13 that scans the object with electromagnetic waves in beam form radiated from the irradiator 12, the electromagnetic wave detection system 11 is not limited to such a structure. For example, even in the case where the electromagnetic wave detection system 11 does not include the reflector 13 and radiates radial electromagnetic waves from the irradiator 12 and acquires information without scanning, effects similar to those of the first embodiment can be achieved.

Although the electromagnetic wave detection system 11 in the first embodiment has a structure in which the first detector 17 and the third detector 22 are passive sensors and the second detector 20 is an active sensor, the electromagnetic wave detection system 11 is not limited to such a structure. For example, even in the case where the first detector 17, the second detector 20, and the third detector 22 are all active sensors or all passive sensors in the electromagnetic wave detection system 11, effects similar to those of the first embodiment can be achieved. Moreover, for example, even in the case where any two of the first detector 17, the second detector 20, and the third detector 22 are active sensors in the electromagnetic wave detection system 11, effects similar to those of the first embodiment can be achieved. Although the electromagnetic wave detection system 11 in the second embodiment has a structure in which the first detector 17 is a passive sensor and the second detector 20 is an active sensor, the electromagnetic wave detection system 11 is not limited to such a structure. For example, even in the case where the first detector 17 and the second detector 20 are both active sensors or both passive sensors in the electromagnetic wave detection system 11, effects similar to those of the second embodiment can be achieved.

It should be noted that the system is disclosed herein as having various modules and/or units for executing specific functions. These modules and units are schematically illustrated to simplify the description of its functionality, and do not necessarily represent specific hardware and/or software. In this regard, the modules, units, and other components may be hardware and/or software implemented to substantially execute the specific functions described herein. Various functions of different components may be any combination or separate ones of hardware and/or software, and may be used separately or in combination. Input/output (I/O) devices or user interfaces including, but not limited to, a keyboard, a display, a touchscreen, and a pointing device may be connected to the system directly or via intervening I/O controllers. Thus, the disclosed various aspects may be embodied in many different forms, and all such embodiments are within the scope of the present disclosure.

REFERENCE SIGNS LIST 10, 100 electromagnetic wave detection apparatus
11 electromagnetic wave detection system
12 irradiator
13 reflector
14 controller
15 upstream optical system
16 separator
17 first detector
18 switching unit
19 first downstream optical system
20 second detector
21, 210 second downstream optical system
22 third detector
as action surface
d1, d2, d3, d4 first direction, second direction, third direction, fourth direction
ob object
se, se1, se2 switching element

The invention claimed is:

1. An electromagnetic wave detection apparatus comprising:
a separator configured to switch between a separation state in which incident electromagnetic waves are separated to travel in a first direction and a second direction and a non-separation state in which the incident electromagnetic waves are not separated;
a first detector configured to detect electromagnetic waves traveling in the first direction, the first detector being an imaging element;
a switching unit including a plurality of switching elements each configured to switch a traveling direction of electromagnetic waves traveling in the second direction between a third direction and a fourth direction;
a second detector configured to detect electromagnetic waves traveling in the third direction, the electromagnetic waves being reflected waves as a result of an object reflecting electromagnetic waves emitted from an irradiator; and
a controller configured to acquire image information based on the electromagnetic waves detected by the first detector and to acquire distance information based on the reflected waves detected by the second detector.

2. The electromagnetic wave detection apparatus according to claim 1, wherein the separator is configured to reflect a part of the incident electromagnetic waves in the first direction and transmit another part of the incident electromagnetic waves in the second direction.

3. The electromagnetic wave detection apparatus according to claim 1, wherein the separator is configured to transmit a part of the incident electromagnetic waves in the first direction and transmit another part of the incident electromagnetic waves in the second direction.

4. The electromagnetic wave detection apparatus according to claim 1, wherein the separator is configured to refract a part of the incident electromagnetic waves in the first direction and refract another part of the incident electromagnetic waves in the second direction.

5. The electromagnetic wave detection apparatus according to claim 1, wherein the incident electromagnetic waves travel in the second direction when the separator is in the non-separation state.

6. The electromagnetic wave detection apparatus according to claim 1, wherein the separator includes a separation surface for separating the incident electromagnetic waves, and
switching from the non-separation state to the separation state is performed by switching the separation surface from a state of not being located in a traveling path of the incident electromagnetic waves to a state of being located in the traveling path, and switching from the separation state to the non-separation state is performed by switching the separation surface from the state of being located in the traveling path to the state of not being located in the traveling path.

7. The electromagnetic wave detection apparatus according to claim 6, wherein the switching from the non-separation state to the separation state is performed by moving the separation surface from outside the traveling path into the traveling path, and the switching from the separation state to the non-separation state is performed by moving the separation surface from the traveling path to outside the traveling path.

8. The electromagnetic wave detection apparatus according to claim 6, wherein the switching from the non-separation state to the separation state is performed by switching, in the traveling path, the separation surface from a non-appearance state to an appearance state, and the switching from the separation state to the non-separation state is performed by switching, in the traveling path, the separation surface from the appearance state to the non-appearance state.

9. The electromagnetic wave detection apparatus according to claim 1, wherein the switching unit is configured to switch each of the plurality of switching elements between a first reflection state in which the electromagnetic waves traveling in the second direction are reflected in the third direction and a second reflection state in which the electromagnetic waves traveling in the second direction are reflected in the fourth direction.

10. The electromagnetic wave detection apparatus according to claim 9, wherein each of the plurality of switching elements includes a reflective surface for reflecting electromagnetic waves, and
the switching unit is configured to switch each of the plurality of switching elements between the first reflection state and the second reflection state by changing an orientation of each respective reflective surface.

11. The electromagnetic wave detection apparatus according to claim 1, wherein the switching unit is configured to switch each of the plurality of switching elements between a transmission state in which the electromagnetic waves traveling in the second direction are transmitted in the third direction and a reflection state in which the electromagnetic waves traveling in the second direction are reflected in the fourth direction.

12. The electromagnetic wave detection apparatus according to claim 11, wherein each of the plurality of switching elements includes a shutter comprising a reflective surface for reflecting electromagnetic waves, and
the switching unit is configured to switch each of the plurality of switching elements between the reflection state and the transmission state by opening or closing each respective shutter.

13. The electromagnetic wave detection apparatus according to claim 12, wherein the switching unit includes a MEMS shutter in which a plurality of the shutters are openable and closable and are arranged in an array.

14. The electromagnetic wave detection apparatus according to claim 11, wherein the switching unit includes a liquid crystal shutter configured to switch each of the plurality of switching elements between the reflection state in which the electromagnetic waves are reflected and the transmission state in which the electromagnetic waves are transmitted, depending on a liquid crystal light orientation.

15. The electromagnetic wave detection apparatus according to claim 1, further comprising
a third detector configured to detect electromagnetic waves traveling in the fourth direction.

16. The electromagnetic wave detection apparatus according to claim 1, wherein the first detector is configured to detect electromagnetic waves traveling in the fourth direction.

17. The electromagnetic wave detection apparatus according claim 1, further comprising
a controller configured to acquire information about surroundings, based on electromagnetic wave detection results from the first detector and the second detector.

18. The electromagnetic wave detection apparatus according to claim 17, wherein the controller is configured to acquire as the information about the surroundings at least one selected from image information, distance information, and temperature information.

19. A non-transitory computer-readable recording medium including a program for causing an apparatus to:

switch between a separation state in which incident electromagnetic waves are separated to travel in a first direction and a second direction and a non-separation state in which the incident electromagnetic waves are not separated;
detect, by a first detector which is an imaging element, electromagnetic waves traveling in the first direction;
cause a plurality of switching elements each configured to switch a traveling direction of electromagnetic waves traveling in the second direction between a third direction and a fourth direction, to switch the traveling direction to the third direction or the fourth direction;
detect, by a second detector, electromagnetic waves traveling in the third direction, the electromagnetic waves being reflected waves as a result of an object reflecting electromagnetic waves emitted from an irradiator; and
acquire image information based on the electromagnetic waves detected by the first detector and to acquire distance information based on the reflected waves detected by the second detector.

20. An electromagnetic wave detection system comprising:
a separator configured to switch between a separation state in which incident electromagnetic waves are separated to travel in a first direction and a second direction and a non-separation state in which the incident electromagnetic waves are not separated;
a first detector configured to detect electromagnetic waves traveling in the first direction, the first detector being an imaging element;
a switching unit including a plurality of switching elements each configured to switch a traveling direction of electromagnetic waves traveling in the second direction between a third direction and a fourth direction;
a second detector configured to detect electromagnetic waves traveling in the third direction, the electromagnetic waves being reflected waves as a result of an object reflecting electromagnetic waves emitted from an irradiator; and
a controller configured to acquire information about surroundings, based on electromagnetic wave detection results from the first detector and the second detector, such that the controller is configured to acquire image information based on the electromagnetic waves detected by the first detector and to acquire distance information based on the reflected waves detected by the second detector.

21. The electromagnetic wave detection apparatus according to claim 1, further comprising a reflector configured to change an irradiation region of electromagnetic waves radiated from the irradiator, wherein the switching element incident electromagnetic waves reflected in the irradiation region is switched so that the reflected waves travel in the third direction.

* * * * *